(12) United States Patent
Lee et al.

(10) Patent No.: US 8,585,817 B2
(45) Date of Patent: Nov. 19, 2013

(54) BIODEGRADABLE THERMOPLASTIC RESIN COMPOSITION COMPRISING CELLULOSE DERIVATIVES AND SURFACE-TREATED NATURAL FIBER

(75) Inventors: Young Kwan Lee, Seoul (KR); Mi Suk Cho, Suwon-si (KR); Chang Kyu Lee, Pyeongtaek-si (KR)

(73) Assignee: Sungkyunkwan University Foundation for Corporate Collaboration, Suwon-si (KR)

( * ) Notice: Subject to any disclaimer, the term of this patent is extended or adjusted under 35 U.S.C. 154(b) by 395 days.

(21) Appl. No.: 12/893,830

(22) Filed: Sep. 29, 2010

(65) Prior Publication Data

US 2011/0073008 A1    Mar. 31, 2011

(30) Foreign Application Priority Data

Sep. 29, 2009   (KR) .................. 10-2009-0092838

(51) Int. Cl.
*C08L 1/12* (2006.01)
*C08L 97/02* (2006.01)
*C08L 1/10* (2006.01)

(52) U.S. Cl.
CPC ... *C08L 1/10* (2013.01); *C08L 1/12* (2013.01); *C08L 97/02* (2013.01); *C08L 2205/12* (2013.01); *C08L 2666/26* (2013.01)

USPC .................... 106/162.5; 428/300.1

(58) Field of Classification Search
USPC .................... 106/162.5; 428/300.1
See application file for complete search history.

(56) References Cited

U.S. PATENT DOCUMENTS

| | | | | |
|---|---|---|---|---|
| 2,033,411 A | * | 3/1936 | Carson | 264/122 |
| 2,400,078 A | * | 5/1946 | Walker et al. | 106/162.5 |
| 2,916,777 A | * | 12/1959 | Crane et al. | 264/200 |
| 3,875,088 A | * | 4/1975 | Arons et al. | 521/134 |
| 4,325,997 A | * | 4/1982 | Brewer et al. | 428/31 |
| 4,343,727 A | * | 8/1982 | Cohen | 524/41 |
| 7,625,961 B2 | * | 12/2009 | Riebel | 524/17 |

* cited by examiner

*Primary Examiner* — David M Brunsman
(74) *Attorney, Agent, or Firm* — Birch, Stewart, Kolasch & Birch, LLP

(57) ABSTRACT

Provided is a biodegradable thermoplastic resin composition including a cellulose derivative and surface-treated natural fiber. More particularly, in preparation of the biodegradable thermoplastic resin composition including the cellulose derivative and the natural fiber, a surface of the natural fiber is treated with alkali and/or sized, thereby increasing a density of the natural fiber, and an interfacial adhesion between the cellulose derivative and the natural fiber to improve a mechanical strength of the biodegradable thermoplastic resin composition. Furthermore, as the cheap natural fiber is used as a reinforcer, the production cost can be reduced.

19 Claims, 2 Drawing Sheets

(a) CTE 735  (b) Kenaf(surface washed)

(c) Kenaf(alkali-treated)  (d) Kenaf(sized)

BIODEGRADABLE THERMOPLASTIC RESIN COMPOSITION COMPRISING CELLULOSE DERIVATIVES AND SURFACE-TREATED NATURAL FIBER

CROSS-REFERENCE TO RELATED APPLICATION

This application claims priority to and the benefit of Korean Patent Application No. 2009-0092838, filed Sep. 29, 2009, the disclosure of which is incorporated herein by reference in its entirety.

BACKGROUND

1. Field of the Invention

The present invention relates to a biodegradable thermoplastic resin composition having cellulose derivatives and a surface-treated natural fiber, and more particularly, to a biodegradable thermoplastic resin composition having cellulose derivatives and a surface-treated natural fiber, in which a density of the natural fiber is increased by subjecting the surface of the natural fiber to an alkali and/or sizing treatment, a mechanical strength of the biodegradable thermoplastic resin composition is improved by increasing the interfacial adhesion between the cellulose derivatives and the natural fiber, and the production cost is reduced using the natural fiber as a reinforcer.

2. Discussion of Related Art

While plastics have brought convenience and wealth to humans, the excessive dependence on the plastics is causing the earth to suffer from a flood of plastic wastes. Fiber-reinforced plastics or polymer composite materials introduced to further improve the characteristics of the plastic are widely used in the field of various applications such as the shipping, automobile, leisure, defense, and aerospace industries. However, since the fiber-reinforced plastics or polymer composite materials are not eco-friendly, they cause environmental pollution. For about a decade, bio composite materials using eco-friendly and durable natural materials have attracted worldwide attention, and thus their steady research and development have been conducted. Such biodegradable plastics can be degraded within 90 to 180 days after being exposed to the air, and thus need not be burned. Therefore, they are very effective in reducing carbon dioxide. Biomass-based materials have taken the spotlight in place of conventional petroleum-based materials as the next generation growth engine for reducing an environmental load such as emission of greenhouse gases and complying with increased international environmental regulations.

Cellulose is the most abundant natural polymer on earth, which serves as a main component comprised in a plant cell wall. Every year, several 100 billion tons of cellulose is photosynthesized. The cellulose is widely used as wood, paper pulp, fiber materials or cellulose derivatives due to very high crystallinity, molecular weight, and rigidity, and low solubility. Cellulosic plastics for industrial use are cellulose derivatives in which different materials bind to hydroxyl groups of cellulose to remove a hydrogen bond. The cellulose derivatives have different properties and biodegradabilities depending on the degree in substitution. Among the cellulose derivatives, cellulose diacetate (CDA) is the most widely used. CDA has been known as a source material for an acetate fiber and is used in the field of various applications as materials for the fiber industry, medical membranes, photographic films, and materials for cigarette filters. It has been known that CDA is prepared in a fiber or film type by solution spinning using acetone as a solvent, but a melting process has been recently introduced with the effective plasticization with a plasticizer. CDA is degraded at a processing temperature since it has a higher glass transition temperature (Tg) than general-purpose plastics. There fore, the Tg should be decreased under the degradation temperature to improve processability. However, plasticized CDA has increased processability, but tends to be decreased in mechanical properties and thermal stability.

The price of the biodegradable plastic is higher than that of conventional synthetic polymers, which is becoming the main issue. There is active research on preparation of composites in which a relatively cheap and abundant natural fiber is added to a biodegradable polymer in order to reduce the price of the biodegradable plastic and improve the mechanical properties. The natural fiber can be completely biodegradable in nature, and has a specific gravity of approximately 1.1 to 1.5, which accounts for about 50 to 60% of a glass fiber widely used in the current industry. Therefore, when such a natural fiber is applied to plastic, a lightweight and eco-friendly product can be obtained. Since the natural fiber absorbs a great deal of carbon dioxide from the air and emits oxygen during its cultivation and growth, it contributes to the prevention of global warming. Unlike the glass fiber or synthetic fiber, the natural fiber is not only reusable but also has no increased concentration of carbon dioxide exhausted to the air during incineration after being used. The natural fiber-engrafted composite is expected to play a more effective role as a reinforcer than the composites to which an inorganic mineral or metal reinforcer is engrafted. The natural fiber-engrafted composite is referred to as a green composite material or a bio composite material, and is known to be widely applied in materials for automobile parts, architecture and civil engineering, and consumer goods.

One of the natural fibers, kenaf, is a cellulosic natural fiber, which is usually produced in Southeast Asia, grows as fast as possible for a maximum of three crops a year, and is easily harvested and produced at a very low price. It has been known that plants on 1-hectare arable land can absorb about 30 to 40 tons of carbon dioxide in a cycle of cultivation.

However, since the natural fiber generally has a considerably low density compared to cellulose, it is difficult to mix and materials are not smoothly provided from a feeder during extrusion, which makes it impossible to increase a filling amount of the natural fiber.

SUMMARY OF THE INVENTION

The present invention is directed to a biodegradable thermoplastic resin composition having excellent properties by using a surface-treated natural fiber to increase a density and filling amount of the natural fiber in the preparation of a composite of cellulose derivatives and a natural fiber by a melting process, a biodegradable molded product using the same, and a method of preparing the same.

In one aspect, a biodegradable thermoplastic resin composition includes: a cellulose derivative including a repeating unit represented by Formula 1; and a surface-treated natural fiber.

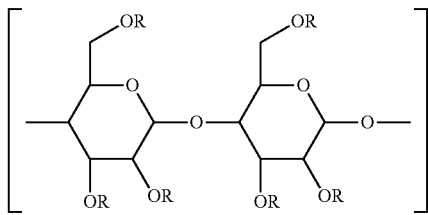

wherein R is H or —C(O)—X, and X is an alkyl group having 1 to 4 carbon atoms, provided that not every R is hydrogen.

In another aspect, a biodegradable molded product comprising a resin composition having excellent biodegradability, processability and physical properties is provided.

In still another aspect, a method for preparing a biodegradable molded product includes: i) providing a cellulose derivative having a repeating unit represented by Formula 1; ii) treating a surface of a natural fiber; and iii) mixing the cellulose derivative with the surface-treated natural fiber and melting the resulting product.

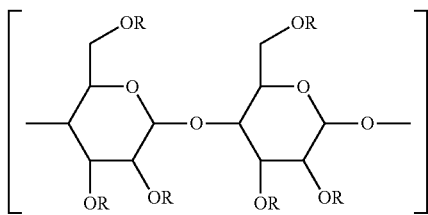

wherein, R is H or —C(O)—X, and X is an alkyl group having 1 to 4 carbon atoms, provided that not every R is hydrogen.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
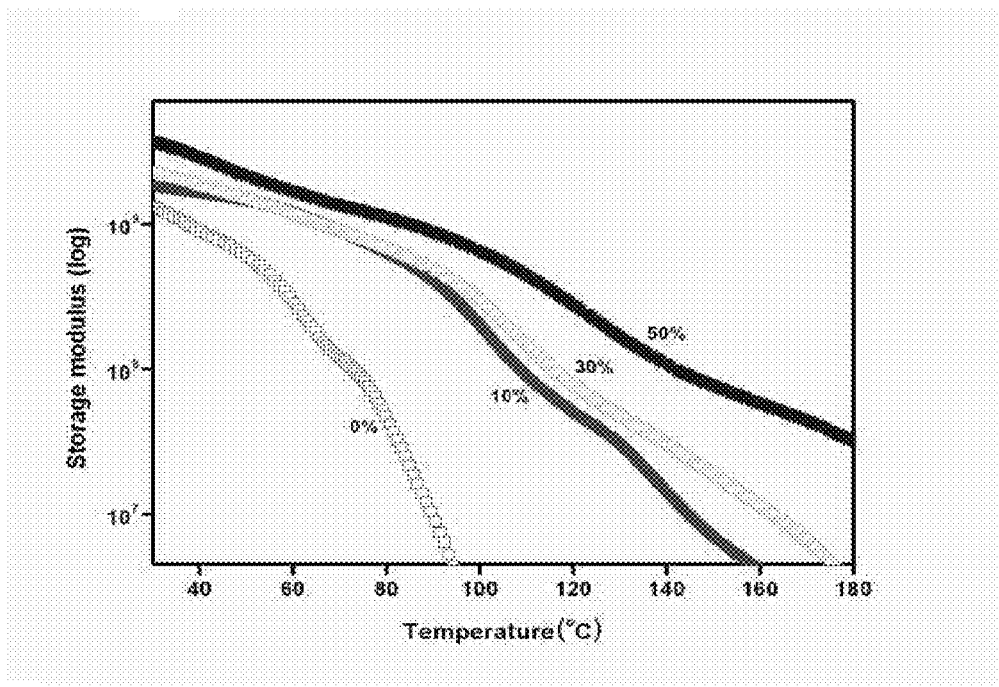
FIG. 1 shows a storage module of a CDA/kenaf composite according to surface treatment of kenaf.

Hereinafter, the present invention will be described with reference to examples and comparative examples in detail. However, the present invention is not limited to these examples.

The present invention relates to a biodegradable thermoplastic resin composition comprising cellulose derivatives having a repeating unit represented by Formula 1, and a natural fiber whose surface is treated.

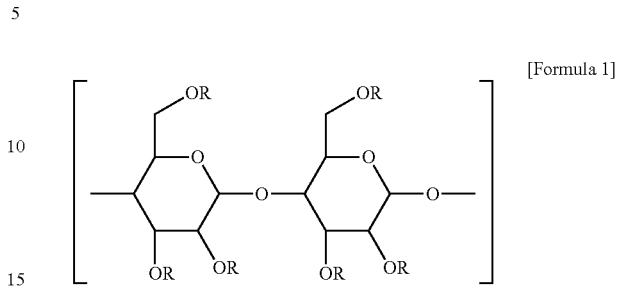

wherein, R is H or —C(O)—X, and X is an alkyl group having 1 to 4 carbon atoms, provided that not every R is hydrogen.

The biodegradable thermoplastic resin composition includes cellulose derivatives and a surface-treated natural fiber composite. The surface-treated natural fiber is increased in density and interfacial adhesion with the cellulose derivative, thereby easily forming the composite of the cellulose derivative and the natural fiber and considerably increasing mechanical strengths such as a tensile strength and the modulus of elasticity, and the glass transition temperature of the composite. Therefore, the biodegradable thermoplastic resin composition has a glass transition temperature of 105 to 127° C.

The cellulose derivative according to one embodiment of the present invention includes a repeating unit represented by Formula 1.

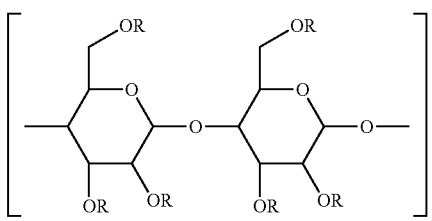

wherein, R is H or —C(O)—X, and X is an alkyl group having 1 to 4 carbon atoms, provided that not every R is hydrogen.

The cellulose derivative may be selected from a cellulose acetate derivative such as cellulose acetate, cellulose diacetate or cellulose triacetate; a cellulose propionate derivative such as cellulose propionate, cellulose dipropionate, or cellulose tripropionate; a cellulose butyrate derivative such as cellulose butyrate, cellulose dibutyrate, or cellulose tributyrate; cellulose acetate propionate derivatives; and cellulose acetate butyrate, and they may be used alone or in combination thereof. Preferably, the cellulose derivative is at least one selected from cellulose acetate, cellulose diacetate, and cellulose triacetate.

The cellulose derivatives may be obtained from a cause of environmental pollution, such as cigarette filter waste. As the biodegradable thermoplastic resin composition may be prepared by recycling the cellulose derivatives in the cigarette filter waste, a price of the biodegradable thermoplastic resin composition may be considerably decreased, and the environmental pollution may be prevented.

The cellulose derivatives may be contained in 50 to 90 parts by weight with respect to 100 parts by weight of the biodegradable thermoplastic resin composition. When the content is in the weight range, both the processability of the biodegradable thermoplastic resin composition and the physical properties of a molded product may be satisfied.

The cellulose derivatives may be used after plasticization with a plasticizer.

The plasticizer includes triacetin (TA), triethyl citrate (TEC), and glycerin, and they may be used alone or in combination thereof. Preferably, the plasticizer is triacetin.

The plasticizer may be contained in 20 to 30 parts by weight with respect to 100 parts by weight of the biodegradable thermoplastic resin composition according to one embodiment of the present invention. When the content is in the weight range, it is easier to perform injection molding in preparation of molded products.

In the plasticization of the cellulose derivatives, the processability of the cellulose derivatives may be improved by further use of a lubricant (or a secondary plasticizer).

As the lubricant, epoxidized soybean oil (ESO) is preferably used. For ring-opening polymerization of the ESO, a latent heat catalyst may be used.

The ESO may be contained in 1 to 5 parts by weight with respect to 100 parts by weight of the biodegradable thermoplastic resin composition according to one embodiment of the present invention. When the content is in the weight range, it is desirable to improve the processability of the cellulose derivatives.

During the plasticization of the cellulose derivative, the plasticizer may reduce the glass transition temperature, thereby improving the processability, but may cause the plasticizer to lose its high original physical properties (high tensile strength and Young's coefficient). For this reason, the mechanical characteristics of the cellulose derivatives can be enhanced and increased by adding a reinforcer (the natural fiber). However, because the natural fiber has a considerably low density compared to cellulose, it is difficult to mix and materials are not smoothly supplied from a feeder during extrusion, which makes it impossible to increase a filling amount of the natural fiber. For this reason, by using the natural fiber whose surface is treated with alkali or sized, the mechanical strength and thus physical properties of the biodegradable thermoplastic resin composition can be improved.

The alkali treatment may include dipping the natural fiber in an alkali solution and annealing the resulting solution.

The sizing process of the natural fiber may be performed using a compound represented by Formula 2.

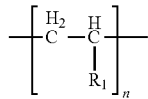

[FIG. 2]

wherein, $R_1$ is a hydroxyl group or a pyrrole group having 1 to 3 substituents, in which the substituent is selected from a halogen atom, a cyano group, a nitro group, a substituted or unsubstituted alkyl group having 1 to 6 carbon atoms, a substituted or unsubstituted cycloalkyl group having 3 to 7 carbon atoms, a substituted or unsubstituted alkenyl group having 2 to 6 carbon atoms and —(C=O)—$R_2$, $R_2$ is a hydrogen atom, a hydroxyl group, a substituted or unsubstituted alkyl group having 1 to 6 carbon atoms, a substituted or unsubstituted alkoxy group having 1 to 6 carbon atoms or —$NR_3R_4$, and $R_3$ and $R_4$ are the same as or different from each other, and may be selected from a hydrogen atom, a hydroxyl group, a substituted or unsubstituted alkyl group having 1 to 6 carbon atoms, a substituted or unsubstituted alkoxy group having 1 to 6 carbon atoms, an amino group, a substituted or unsubstituted mono or di(C1-C6 alkyl)amino group, a substituted or unsubstituted aryl group having 6 to 14 carbon atoms, and a substituted or unsubstituted saturated or unsaturated heterocyclic group. Alternatively, $R_3$ and $R_4$ are independently a saturated or unsaturated cyclic amino group having 1 or 2 heterocyclic atoms selected from the group consisting of nitrogen, oxygen and sulfur, which are present in a ring structure with adjacent nitrogen atoms and added to the corresponding adjacent nitrogen atoms. The cyclic amino group indicates a substituent, and n is an integer of 1 to 4500.

In the specification, when a certain structure has a "substituent," it means one or at least two "substituents" are placed on chemically available positions of the corresponding structure. The kind, number, and position of the substituent which is present (or likely to be present) in the corresponding structure are not particularly limited, and when at least two substituents are present, they may be the same as or different from each other.

Examples of the "substituents" may include a halogen atom, a hydroxyl group, a cyano group, a nitro group, an alkyl group having 1 to 6 carbon atoms, a cycloalkyl group having 3 to 7 carbon atoms, an alkenyl group having 2 to 6 carbon atoms, an alkoxy group having 1 to 6 carbon atoms, —(C=O)—$R_2$, —$NR_3R_4$, —$NR_{3'}R_{4'}$, an oxo group, a saturated or unsaturated heterocyclic group, and an aryl group having 6 to 14 carbon atoms. Normally, 1 to 3 substituents are included.

Examples of the "halogen atom" include fluorine, chlorine, bromine, and iodine atoms.

The "alkyl group having 1 to 6 carbon atoms" is a linear or branched alkyl group having 1 to 6 carbon atoms, and may include methyl, ethyl, n-propyl, isopropyl, n-butyl, isobutyl, sec-butyl, tert-butyl, n-pentyl, isopentyl, neopentyl, and n-hexyl groups.

The "cycloalkyl group having 3 to 7 carbon atoms" may include a cyclopropyl group, a cyclobutyl group, a cyclopentyl group, a cyclohexyl group, or a cycloheptyl group.

The "alkenyl group having 2 to 6 carbon atoms" may include an ethenyl group, an aryl group, a butenyl group, a butadienyl group, and a hexatrienyl group.

The "alkoxy group having 1 to 6 carbon atoms" represents a linear or branched alkoxy group having 1 to 6 carbon atoms, and may include methoxy, ethoxy, n-propoxy, isopropoxy, n-butoxy, isobutoxy, sec-butoxy, tert-butoxy, n-pentyloxy, isopentyloxy, neopentyloxy, and n-hexyloxy groups.

$R_2$ in "—(C=O)—$R_2$" may include a hydrogen atom, a hydroxyl group, an alkyl group having 1 to 6 carbon atoms, an alkoxy group having 1 to 6 carbon atoms, a saturated or unsaturated heterocyclic group, and an aryl group having 6 to 14 carbon atoms.

$R_3$, $R_4$, $R_{3'}$ and $R_{4'}$ of "—$NR_3R_4$" and "—$NR_{3'}R_{4'}$" are the same or different from each other, and may include a hydrogen atom, a hydroxyl group, an alkyl group having 1 to 6 carbon atoms, an alkoxy group having 1 to 6 carbon atoms, an amino group, a mono or di(C1-C6 alkyl)amino group, a (C1-C6 alkoxy)carbonyl group, a mono or di(C1-C6 alkyl)amino carbonyl group, a saturated or unsaturated heterocyclic group, and an aryl group having 6 to 14 carbon atoms.

Each of "—$NR_3R_4$" and "—$NR_{3'}R_{4'}$" preferably forms a saturated or unsaturated cyclic amino group (particularly, a 5- or 6-membered saturated or unsaturated cyclic amino group having adjacent nitrogen atoms and one or two heterocyclic atoms selected from the group consisting of nitrogen, oxygen, and sulfur atoms added to the corresponding adjacent nitrogen atoms), and may include azetidinyl, pyrrolidinyl, piperidinyl, piperazinyl, morpholinyl, thiomorpholinyl, homopiperadinyl, imidazolinyl, pyrrolyl, imidazolidinyl, oxazolidinyl, thiazolidinyl, pyrazolidinyl, imidazolinyl, pyrazolinyl, pyrazolyl, and triazolyl groups.

The "saturated or unsaturated heterocyclic group" may include pyrrolidinyl, piperadinyl, morpholinyl, thiomorpholinyl, homopiperidinyl, imidazolyl, thienyl, furyl, pyrrolyl, oxazolyl, isoxazolyl, thiazolyl, isothiazolyl, pyrazolynyl, triazolyl, tetrazolyl, pyridyl, pyradyl, pyrimidinyl, pyridazyl, indolyl, isoindolyl, indazolyl, methyleneoxyphenyl, ethylenedioxyphenyl, benzofuranyl, dihydrobenzofuranyl, benzoimidazolyl, benzoxazolyl, benzothiazolyl, purinyl, quinolyl, isoquinolyl, quinazolyl, quinoxalyl, or 2,3,4,5-tetrahydro-3-oxo-pyridazine-6-yl groups.

The "aryl group having 6 to 14 carbon atoms" may include phenyl, naphthyl and anthracene group.

The "mono or di(C1-C6 alkyl) group" represents an amino group having one or two linear or branched alkyl groups having 1 to 6 carbon atoms as substituents, and may include methyl amino, ethyl amino, n-propylamino, n-hexylamino, dimethylamino, methylethylamino and ethylisobutylamino groups.

The "(C1-C6 alkyl)carbonyl group" may include acetyl, propionyl and butyroyl groups.

The "(C1-C6 alkoxy)carbonyl group" may include methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl, neopentyloxycarbonyl and n-hexyloxycarbonyl groups.

The "mono or di(C1-C6 alkyl)aminocarbonyl group" may include methylaminocarbonyl, ethylaminocarbonyl, n-propylaminocarbonyl, isopropylaminocarbonyl, n-butylaminocarbonyl, isobutylaminocarbonyl, sec-butylaminocarbonyl, tert-butylaminocarbonyl, n-pentylaminocarbonyl, isopentylaminocarbonyl, neopentylaminocarbonyl, n-hexylaminocarbonyl, dimethylaminocarbonyl, methylethylaminocarbonyl and ethylisobutylaminocarbonyl groups.

As a preferable substituent having a pyrrole ring, —NR$_3$R$_4$ may be used, in which R$_3$ and R$_4$ are independently a saturated or unsaturated cyclic amino group having one or two heterocyclic atoms selected from the group consisting of nitrogen, oxygen and sulfur atoms, which are present in a ring structure with adjacent nitrogen atoms and are added to the corresponding adjacent nitrogen atoms. The cyclic amino group indicates a substituent.

The natural fiber is selected from the vegetable natural fibers including coconut fiber, kenaf, ramie fiber, sisal fiber, henequen fiber, pineapple leaf fiber, cotton fiber, coir fiber, and straw, and they may be used alone or in combination thereof.

The natural fiber may be contained in 10 to 50 parts by weight with respect to 100 parts by weight of the biodegradable thermoplastic resin composition according to one embodiment of the present invention. When the content is in the weight range, the modulus of elasticity and glass transition temperature is concentration-dependently increased, and thus injection molding is more easily performed in the preparation of the molded product.

The cellulose derivatives and the surface-treated natural fiber may be mixed in a weight ratio of 5:5 to 9:1. In this range, both the processability of the biodegradable thermoplastic resin composition and the physical properties of the molded product can be satisfied.

The present invention relates to a biodegradable molded product comprising the thermoplastic resin composition according to one embodiment of the present invention having excellent biodegradability, processability and physical properties.

The biodegradable molded product prepared as described above may be used for semiconductor packaging films, various disposable products such as containers, cups, spoons, forks, knives, toothbrushes, and straws, melty coating such as paper coating for paper cups and paper plates, agricultural and gardening products such as mulching films, plant pots and clips, film/wrapping products such as garbage bags, compost bags, contracting films and wrapping films, medical appliances such as syringes for animal use and mouthpieces for endoscopes, soft biodegradable plastic modifiers, golf tees, fishing nets, fishing lines, bottles and all kinds of stationery.

The present invention also relates to a method for preparing a biodegradable molded product, including: i) providing a cellulose derivative having a repeating unit represented by Formula 1; ii) treating a surface of a natural fiber; and iii) mixing the cellulose derivative with the surface-treated natural fiber and melting the resulting product.

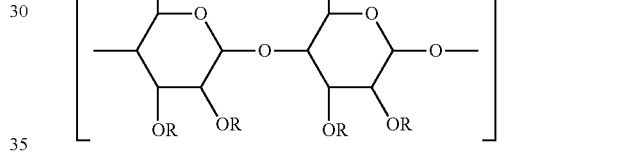

[Formula 1]

wherein, R is H or —C(O)—X, in which X is an alkyl group having 1 to 4 carbon atoms, provided that not every R is hydrogen.

In step i) to provide the cellulose derivative, the derivative may be synthesized or obtained from a natural material by various methods known in the art.

The step i) may include plasticizing the cellulose derivative by adding a plasticizer or a lubricant to the cellulose derivative.

Here, preferable contents of the respective components, for example 50 to 90 parts by weight, and preferably 70 to 80 parts by weight, of the cellulose derivative, 20 to 30 parts by weight of the plasticizer, and 1 to 5 parts by weight of the lubricant are added with respect to the total 100 parts by weight of the composition.

In step ii), the surface of the natural fiber to be added as a reinforcer to the cellulose derivative or plasticized composition provided in step i) is treated with alkali or sized.

Since the natural fiber has a considerably lower density compared to the cellulose derivative, it is difficult to mix and the materials are not smoothly supplied from a feeder during extrusion, which makes it impossible to increase a filling amount of the natural fiber. However, by subjecting alkali treatment or sizing to the surface, the density of the natural fiber and an interfacial adhesion with the cellulose derivative may be increased. Furthermore, the natural fiber serves to improve the physical properties of the biodegradable molded product according to one embodiment of the present invention.

The alkali treatment may include dipping the natural fiber in an alkali solution and heating the resulting product.

The sizing may include mixing the natural fiber with a compound of Formula 2.

The sizing may be performed by mixing the natural fiber with the compound of Formula 2 in a weight ratio of 1:1 to 1:0.5. In this range, due to an excellent mechanical strength, the content of the surface-treated natural fiber does not exceed 50 parts by weight with respect to the cellulose derivative. Therefore, the addition of an excess of a sizing agent beyond the content range is uneconomical to reduce the production cost.

The sizing of the natural fiber may be performed by a conventional method, but the present invention is not particularly limited thereto.

The step ii) may further include pretreating the natural fiber with a mixture of organic solvents before the alkali treatment of the natural fiber.

The mixture of organic solvents may be prepared by mixing alcohol with benzene in a volume ratio of 1:2.

The pretreatment may be performed by dipping the natural fiber in the mixture of organic solvents at 50 to 80° C. for 2 to 72 hours, washing it with distilled water, and drying it.

In step iii), the surface-treated natural fiber provided in step ii) is mixed with the cellulose derivative or plasticized composition provided in step i), and then the resulting product is subject to a melting process, for example, extrusion or injection. Here, the cellulose derivative and the surface-treated natural fiber may be mixed in a weight ratio of 5:5 to 9:1.

The mixing and melting process, for example, extrusion or injection, may be performed using a conventional method of mixing, extruding and injecting the biodegradable thermoplastic resin composition. For example, the mixing may be performed using a batch mixer, and the extrusion may be performed using a single or twin screw extruder without limitation.

Preferably, the mixing is performed at 190 to 210° C. due to a low melting point of cellulose diacetate.

After the mixing is performed at the temperature range, the mixed product may be formed at 140 to 210° C. into a molded product by using a conventional extruder or injector.

Hereinafter, the present invention will be described in further detail with reference to examples according to the present invention and comparative examples not according to the present invention, but the scope of the present invention is not limited to the following examples.

Example 1

Preparation of Cellulose Diacetate/Kenaf Composite

Cellulose diacetate [CDA, Mw. ca. 265,660 g/mol, acetyl substitution: 2.46] used in preparation of a composite of this example was purchased from Celanese, triacetin (TA) used as a plasticizer was purchased from Dae Shin Chemical Co., Ltd., epoxidized soybean oil (ESO, Mw. 1000) used as a lubricant was purchased from Shin-dongbang Company, and kenaf was purchased from Soo Trading Co., Ltd. An average length of the kenaf was 1 m. Polyvinylpyrrolidone (PVP) used as a sizing agent was in a powdery form, and purchased from Aldrich Co., Ltd. Polyvinylalcohol (PVA) was used in an aqueous solution containing 20 wt % solid, and purchased from SAN NOPCO KOREA. CDA powder and kenaf were dried at 70° C. before processing.

(Plasticization of Cellulose Diacetate (CDA))

The CDA was dried for 24 hours at 80° C. in a dry oven. After the CDA and TA were input to a super mixer in a weight ratio of 7:3, 5 phr of the ESO, a secondary plasticizer, was added to the mixture to improve melting processability, and the resulting mixture was mixed at a high speed of 850 rpm for 1 minute and 40 seconds. The CDA mixed with the TA and ESO was dried at 80° C. for 24 hours in a dry oven, and was milled into small particles using a miller.

(Surface Treatment of Natural Fiber)

The kenaf was washed with water at 70° C. for 2 hours, and air-dried for three days. The dry kenaf fiber was dipped in a solution of a mixture of ethanol and benzene in a volume ratio of 1:2 for dewaxing, stored in a dry oven at 50° C. for 72 hours, washed with distilled water, and dried again. After the drying, the kenaf was sufficiently soaked in an aqueous solution containing 6 parts by weight of NaOH, and heated for 3 hours. After the NaOH aqueous solution was removed, the kenaf was washed with distilled water and air-dried.

Subsequently, the kenaf fiber was sized with PVA. Here, the kenaf was mixed with the PVA aqueous solution in a ratio of 1:1 or 1:0.5 (w/w) and stirred for 1 hour using a mechanical stirrer. The resulting product was dried at 100° C. for 5 hours in a dry oven, and after the temperature was adjusted to 70° C., the product was further dried for 24 hours.

Meanwhile, the sizing of the kenaf fiber with PVP was performed by adding PVP powder to distilled water and stirring the resulting solution using the mechanical stirrer until it was completely dissolved. Afterwards, the kenaf was mixed with the PVP in a ratio of 1:1 or 1:0.5 (w/w) and stirred for 1 hour using the mechanical stirrer.

Then, the sized kenaf fiber was milled into particles using a miller. The kenaf particles were dried at 70° C. for 24 hours in a dry oven.

(Preparation of Composite Using Haake Mixer and Twin Screw Extruder)

To identify processing conditions for melting extrusion, 10 and 30 parts by weight of the kenaf fiber sized with the PVA or PVP were respectively input to Haake mixers. In detail, Haake Pheomix 600 used herein was a closed mixer purchased from Thermo scientific (Germany), and set for a process under conditions of a barrel temperature of 200° C., a screw speed of 60 rpm, and a retention time of 10 minutes. The mixed product was dried at 80° C. for 24 hours in a dry oven. On the basis of the results obtained by investigating the characteristics of the CDA/kenaf composite prepared in the Haake mixer, the resulting product was melt-extruded using an extruder. The melt extrusion using the twin screw extruder was performed while inputting the kenaf fiber to the plasticized CDA in a content of 10, 30 or 50 parts by weight. The twin screw extruder used herein was an intermeshing co-rotating modular BT-19 purchased from BAU-TECH Inc., the modular having a screw diameter of 19 mm and L/D of 40. The extruder has a total of five mixing sections, and has a reverse screw disposed at one side thereof. In each section, the CDA and the kenaf fiber were mixed while being melted. In this example, the temperatures from a hopper to a die were set to 140, 150, 160, 170, 180, 180, 190 and 200° C. The screw speed was set to a constant speed of 150 rpm. The extruded product obtained from the die was passed through a cooling vessel and molded into a pellet using a pelletizer, and then dried at 80° C. for 24 hours in a convection oven.

(Preparation of Specimen)

To check mechanical properties of the CDA/kenaf composite, a tensile specimen based on ASTM D 638 was prepared using a mini injector from BAU-TECH Inc. In the preparation of the specimen, an injection pressure, a temperature of a cylinder and a circulation processing time were set to 900 psi, 200° C., and 3 minutes and 10 seconds, respectively. At least 10 specimens were prepared. To check dynamic mechanical analysis (DMA) characteristics of the composite, analytic specimens (0.5×40×0.3 mm) were prepared using a hydraulic press from Carver. The specimens were prepared under the conditions of a processing temperature of 200° C., a pressure of 1000 psi, and a circulation processing time of 4 minutes and 30 seconds by compositions. To check dispersion and interfacial adhesion of the kenaf in a matrix using a scanning electron microscope (SEM), specimens were prepared under the same conditions as the specimens for DMA, freeze-dried in liquid nitrogen for 5 seconds, and fractured.

Experimental Example 1

Analysis of Mechanical Properties

For a tensile test, the specimens were measured for mechanical properties under the conditions of a weight of 1 KN and a cross-head speed of 10 mm/min using a universal tensile machine (UTM; LLOYD Inc., LR 30K). At least 10 test specimens were tested to calculate average values of the tensile strength, elongation, and modulus of elasticity.

properties of the kenaf were improved with an increase in amounts of the PVA and PVP. Among the PVA and PVP, PVA was more effective for the improvement in mechanical properties.

As shown in Table 2, in the specimens prepared using the Haake mixer, the plasticized CDA exhibits a tensile strength of 46 MPa, a modulus of elasticity of 1687 MPa, and an elongation of 11%.

The composite prepared with CDA by treating the kenaf with 6% alkali tended to exhibit a tensile strength of 74.8 MPa and a modulus of elasticity of 4165 MPa. The kenaf was composed of cellulose (53 to 57%), hemicellulose (15 to 19%) and lignin (5.9 to 9.3%). The alkali treatment removed the components of the fiber such as hemicellulose and lignin and thus increased the content and surface roughness of the cellulose on a surface of the fiber. Accordingly, it was estimated that the improvement of the interfacial adhesion caused by the alkali treatment of the kenaf causes the improvement of the mechanical properties of the composite.

TABLE 1

| | | Biopolymer %(w/w) | Reinforce %(w/w) | Ratio of Natural Fiber to Sizing Agent | Tensile Strength (MPa) | Elongation (%) | Young's Coefficient (MPa) |
|---|---|---|---|---|---|---|---|
| CDA/KENAF | PVA Sizing | CTE735(90) | Kenaf(10) | PVA sizing(1:1) | 72.3 | 3.8 | 3122 |
| | | CTE735(70) | Kenaf(30) | PVA sizing(1:1) | 85.6 | 2.8 | 4831 |
| | | CTE735(90) | Kenaf(10) | PVA sizing(1:0.5) | 56 | 5.2 | 2508 |
| | | CTE735(70) | Kenaf(30) | PVA sizing(1:0.5) | 62.7 | 4.4 | 3306 |
| | PVP Sizing | CTE735(90) | Kenaf(10) | PVP sizing(1:1) | 70.9 | 4.5 | 2955 |
| | | CTE735(70) | Kenaf(30) | PVP sizing(1:1) | 77.4 | 3.1 | 4337 |
| | | CTE735(90) | Kenaf(10) | PVP sizing(1:0.5) | 55.4 | 5.5 | 2442 |
| | | CTE735(70) | Kenaf(30) | PVP sizing(1:0.5) | 60.2 | 4.5 | 2920 |

TABLE 2

Comparison of Mechanical Characteristics of CDA/kenaf Biodegradable Composite (Haake Mixer)

| | CTE (wt %) | Kenaf (Surface Treated, wt %) | Tensile Strength (MPa) | Elongation (%) | Young's Coefficient (MPa) |
|---|---|---|---|---|---|
| 1 | 100 | 0 | 46 | 11 | 1687 |
| 2 | 70 | 30(6% NaOH) | 74.8 | 3.4 | 4165 |
| 3 | 70 | 30(PVP Sizing) | 77.4 | 3.1 | 4337 |
| 4 | 70 | 30(PVA Sizing) | 85.6 | 3.2 | 4831 |

CTE-CDA:TA:ESO/70:30:5phr

TABLE 3

Comparison of Mechanical Characteristics of CDA/kenaf Biodegradable Composite (Twin Screw Extruder)

| | CDA (wt %) | Kenaf (wt %) | Tensile Strength (MPA) | Elongation (%) | Young's Coefficient (MPa) | Flexural Strength (MPa) | Impact Strength (kgf·cm/cm) |
|---|---|---|---|---|---|---|---|
| 1 | 100 | 0 | 46 | 11 | 1687 | 1511 | 12.9 |
| 2 | 95 | 5 | 50 | 7.7 | 2026 | — | — |
| 3 | 90 | 10 | 68.6 | 6 | 2291 | 2156 | 5.6 |
| 4 | 70 | 30 | 73.4 | 4.7 | 3518 | 4039 | 3.6 |
| 5 | 50 | 50 | 83.2 | 3.4 | 4706 | — | — |

CTE-CDA:TA:ESO/70:30:5phr

The tensile strength of the composite to which the alkali-treated kenaf was added was 74.8 MPa, and the tensile strength of the composite to which the kenaf sized with PVA was added was increased to 85 MPa. The moduli of elasticity were also increased to 4165 MPa to 4831 MPa due to the alkali treatment and the PVA sizing. However, the kenaf-added composite exhibited an elongation of 2.3 to 3.4, which is considerably lower than the plasticized CDA. This is a common phenomenon shown in mechanical properties in the preparation of the composite due to the addition of a natural fiber and an inorganic filler.

As shown in Table 1, when the kenaf was sized with the PVA and PVP in sizing ratios of 1:1 and 1:0.5, the mechanical Also, it can be confirmed that the mechanical properties were increased with the pretreatment of the natural fiber using the Haake mixer, and therefore the various CDA/kenaf composites were prepared using an extruder, depending on the contents of the kenaf.

As shown in Table 3, like the measurement results of the specimens prepared using the Haake mixer, as the content of the kenaf fiber was increased, the tensile strength and modulus of elasticity were increased and the elongation was decreased. As described above, it is a common phenomenon shown in the composite prepared by adding a reinforcer to a cellulose matrix. It can be noted that according to the filling amount of the kenaf fiber in case of the flexural strength, a deformation resistance with respect to the weight applied from an external environment was improved due to an increase in a reinforcement effect. It was determined that the crystallinity was also improved due to the reinforcement of the kenaf fiber. However, impact characteristics become weaker with the increase in the filling amount of the kenaf fiber.

Experimental Example 2

Analysis of Thermal Stability and Dynamic Characteristics

To check a glass transition temperature and storage modulus of elasticity of the composite, a dynamic mechanical analyzer (Seiko Exstar 6000, DMA/SS6100) was used. An increasing rate was 10° C./min, and the analysis was performed up to 25 to 250° C. in an $N_2$ atmosphere at a frequency of 1 Hz. A tension/sinusoidal mode was used with a power of 200 mN.

For comparison of thermal stability, a thermal degradation temperature was measured in a nitrogen atmosphere at an increasing rate of 10° C./min in a temperature range of 25 to 500° C. using TGA7 from Perkin-Elmer. Approximately 10 mg of the composite was used.

Figure 2:
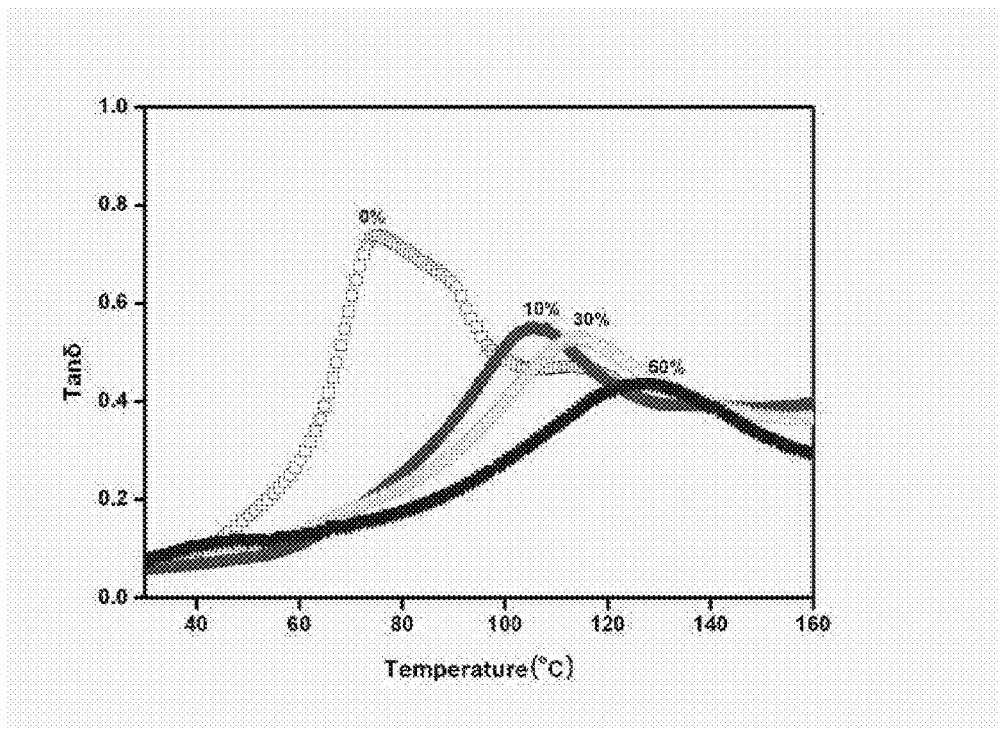
FIG. 2 shows a Tan δ curve of a CDA/kenaf composite according to surface treatment of kenaf.

FIGS. 1 and 2 show the storage modulus of elasticity and tan θ curve of composite specimens prepared by adding kenaf treated with alkali and sized with PVA to plasticized CDA in contents of 10, 30, and 50 parts by weight, respectively.

As shown in FIG. 1, it can be noted that the storage moduli of elasticity at room temperature were increased with an increase in the filling amount of the kenaf, and it can be confirmed that the thermal deformation temperature or RT modulus of elasticity were increased with the increase in the filling amount of the kenaf. A polymer material is a viscoelastic body that has both viscous liquid and elastic solid characteristics. The storage modulus of elasticity represents the stiffness of a material. The increase in the storage modulus of elasticity with the increase in the filling amount of the kenaf fiber shows that the kenaf fiber sufficiently serves as a reinforcer.

From the tan δ curve of FIG. 2, the glass transition temperature of the CDA/kenaf composite specimen was observed. Generally, the tan δ curve according to the change in the temperature can show the movement of a small group of the polymer chains and the interfacial characteristics of different materials. Thus, peaks of the tan δ curve may be changed depending on the conditions of treating the kenaf in the composite system, and a subtle transition changed by the influence of the plasticizer may be observed. Depending on the conditions of treating the kenaf, it can be confirmed that Tg is increased from 135 to 163° C., which indicates that the kenaf is uniformly dispersed in the composite.

Figure 3:
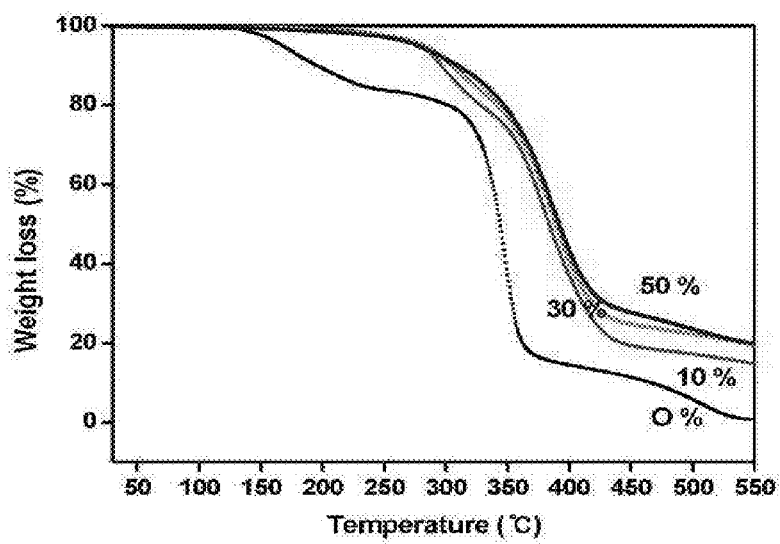
FIG. 3 shows a thermogravimetric analysis (TGA) curve of a CDA/kenaf composite according to surface treatment of kenaf.

As shown in FIG. 3, the TGA analysis is performed to confirm the thermal stability of the composite according to the contents of the plasticized CDA treated with alkali and the kenaf sized with PVA. It can be confirmed from the analysis that the plasticized CDA was decreased in weight from a low temperature due to the addition of the plasticizer compared to pure CDA. The degradation of the plasticized CDA at 320° C. or less is observed in two degradation regions: one degradation is caused by the evaporation of volatile components such as moisture and the plasticizer contained in the CDA, and the other dramatic degradation observed over 320° C. is caused by the degradation of α-cellulose of the components of the cellulose. The composite containing 10 parts by weight of the kenaf fiber has two degradation regions. On the other hand, the composite containing 30 to 50 parts by weight of the kenaf fiber has one degradation region, which indicates that the composite shows a different degradation pattern from the composite containing the plasticized CDA and 10 parts by weight of the kenaf fiber because of the improved interfacial adhesion between different materials. A final content of non-degraded components in the composite may be clearly seen in a region over 430° C., and the increase in the filling amount of the kenaf fiber can be effective for improving the thermal stability of the composite. This is because the fiber has low thermal conductivity because of a hollow structure of the cytoplasm. Accordingly, as the filling amount of the kenaf fiber is increased, the thermal stability is also increased.

Experimental Example 3

Analysis of Morphological Characteristics

The surface morphology of the fracture of the CDA/kenaf composite film was examined by Scanning Electron Microscopy (SEM, JEOL/JSM 7000F).

Figure 4:
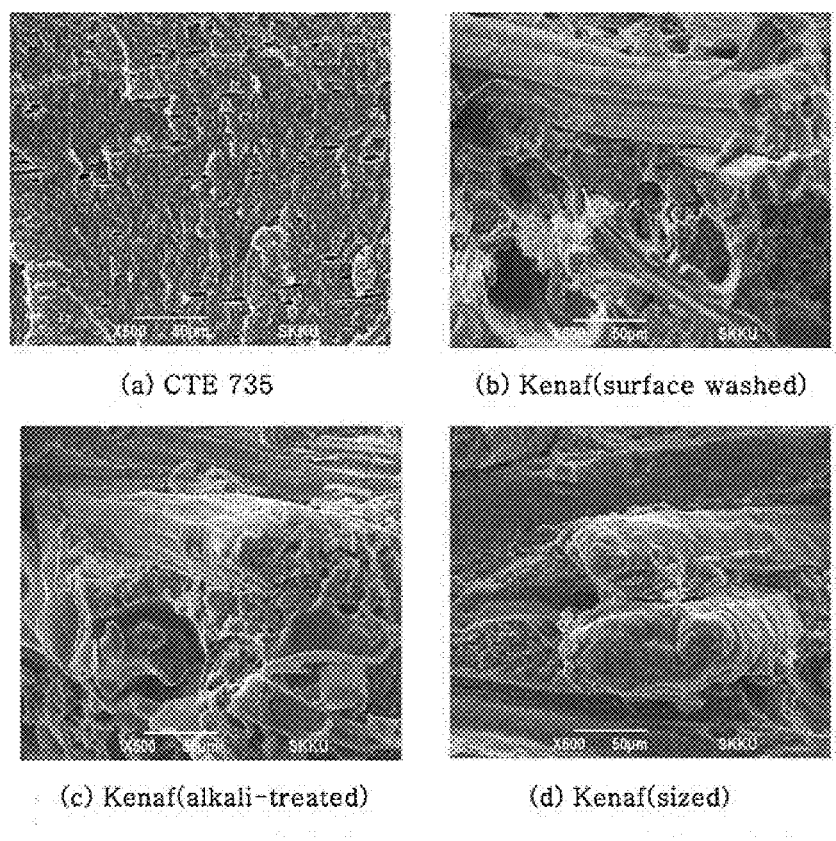
FIG. 4 shows scanning electron microscope (SEM) images of fracture surfaces of a CDA/kenaf composite according to surface treatment of kenaf.

FIG. 4 shows SEM images of the fractures of the film prepared by adding pure kenaf fiber, kenaf fiber treated with alkali and kenaf fiber sized with PVA to a plasticized CDA matrix. Generally, a mechanical tensile strength of the composite is affected by the microstructural shape of the composite. In FIG. 4, (a) shows an interface of the plasticized CDA, (b) shows an interface of the composite to which non-treated kenaf fiber is added, (c) shows an interface of the composite to which the alkali-treated kenaf fiber is added, and (d) shows an interface of the composite sized with PVA. Each specimen was formed into a thin film using a hydraulic press, dipped in liquid nitrogen and fractured. Subsequently, a cross-section of the fracture was examined. As shown in the image of the pure kenaf, the kenaf fiber is separated from the CDA matrix because of low interfacial adhesion with the CDA. However, the composite to which the alkali-treated kenaf fiber is added clearly shows improved adhesion with the matrix. The SEM image of the composite to which the kenaf fiber sized with PVA is added can show more improved interfacial adhesion such that the kenaf fiber is uniformly and stably integrated with the CDA matrix without separation or interfacial breakdown. This is because the PVA serves as a binder connecting the plasticized CDA with the kenaf fiber, and thus miscibility of the composite is improved.

As a result, in the preparation of the composite of the cellulose derivatives and the natural fiber, as the density of the natural fiber is increased, and the interfacial adhesion between the cellulose derivative and the natural fiber is increased during the washing and the treatment with alkali and a washing agent, the filling amount of the natural fiber is increased to easily mix the cellulose derivative and the natural fiber, the mechanical strength of the composite is improved, and the composite can exhibit excellent physical properties such as increased tensile strength, elongation, and glass transition temperature. Further, the surface treatment of the natural fiber is effective for dispersing the cellulose derivative and the natural fiber. Accordingly, it is confirmed that when the cellulose derivative is used as a matrix, and cheap natural fiber is used as a reinforcer, they can serve as more effective reinforcers than an inorganic mineral or a metal reinforcer.

According to the present invention, when natural fiber is used as a reinforcer in the biodegradable thermoplastic resin composition containing a cellulose derivative as a matrix, the alkali treatment or sizing can be used to increase interfacial adhesion between the two materials, a density of the reinforcer and a filling amount of the natural fiber. Thus, the present invention can provide the biodegradable thermoplastic resin composition which has excellent properties and can be reduced in the production cost.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A biodegradable composite, comprising:
   a cellulose derivative including a repeating unit represented by Formula 1; and
   an alkali-treated and/or PVA or PVP-sized vegetable natural fiber,
   wherein the cellulose derivative and the alkali-treated and/or sized vegetable natural fiber are included in a weight ratio of 7:3 to 9:1:

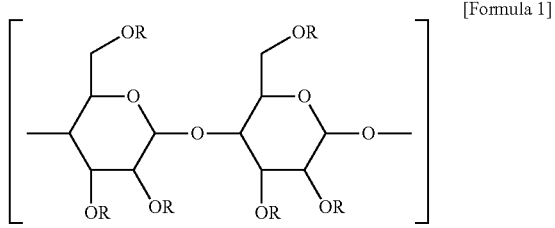

[Formula 1]

wherein R is H or —C(O)—X, and X is an alkyl group having 1 to 4 carbon atoms, provided that not every R is hydrogen.

2. The composite according to claim 1, wherein the cellulose derivative includes at least one selected from the group consisting of cellulose acetate, cellulose diacetate, and cellulose triacetate.

3. A biodegradable molded product prepared by mixing and melting the biodegradable composite defined in claim 2.

4. The composite according to claim 1, wherein the cellulose derivative is plasticized by a plasticizer and a lubricant.

5. The composite according to claim 4, wherein the plasticizer includes at least one selected from the group consisting of triacetin (TA), triethyl citrate (TEC) and glycerin.

6. A biodegradable molded product prepared by mixing and melting the biodegradable composite defined in claim 5.

7. The composite according to claim 4, wherein plasticizing of the cellulose derivative is performed by adding 20 to 30 parts by weight of a plasticizer and 1 to 5 parts by weight of a lubricant to 50 to 90 parts by weight of the cellulose derivative.

8. A biodegradable molded product prepared by mixing and melting the biodegradable composite defined in claim 7.

9. The composite composition according to claim 4, wherein the lubricant includes epoxidized soybean oil.

10. A biodegradable molded product prepared by mixing and melting the biodegradable composite defined in claim 9.

11. A biodegradable molded product prepared by mixing and melting the biodegradable composite defined in claim 4.

12. A biodegradable molded product prepared by mixing and melting the biodegradable composite defined in claim 1.

13. The molded product according to claim 12, which is selected from the group consisting of semiconductor packaging films, containers, cups, spoons, forks, knives, toothbrushes, straws, paper coating for paper cups, paper plates, mulching films, plant pots and clips, garbage bags, compost bags, contracting films, wrapping films, syringes for animal use, mouthpieces for endoscopes, soft biodegradable plastic modifiers, golf tees, fishing nets, fishing lines, bottles and stationery.

14. A method of preparing a biodegradable molded product, comprising:
   i) providing a cellulose derivative having a repeating unit represented by Formula 1;
   ii) subjecting a vegetable natural fiber to alkali treatment or sizing with PVA or PVP; and
   iii) mixing the cellulose derivative with the alkali-treated or sized vegetable natural fiber in a weight ratio of 7:3 to 9:1 and melting the resulting product,

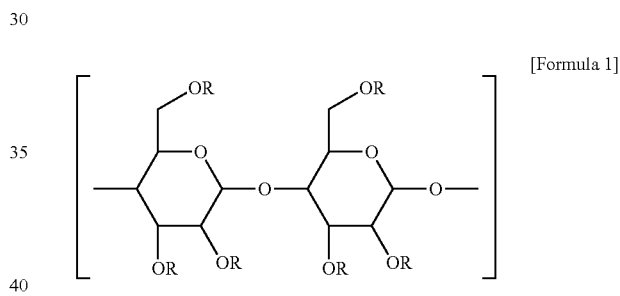

[Formula 1]

wherein R is H or —C(O)—X, and X is an alkyl group having 1 to 4 carbon atoms, provided that not every R is hydrogen.

15. The method according to claim 14, wherein the step i) includes adding 20 to 30 parts by weight of a plasticizer and 1 to 5 parts by weight of a lubricant to 50 to 90 parts by weight of the cellulose derivative to plasticize the cellulose derivative.

16. The method according to claim 15, wherein the plasticizer includes at least one selected from the group consisting of triacetin (TA), triethyl citrate (TEC), and glycerin.

17. The method according to claim 15, wherein the lubricant includes epoxidized soybean oil.

18. The method according to claim 14, wherein the cellulose derivative includes at least one selected from the group consisting of cellulose acetate, cellulose diacetate, or cellulose triacetate.

19. The method according to claim 14, wherein the sizing includes mixing the vegetable natural fiber with PVA or PVP in a weight ratio of 1:1 to 1:0.5.

* * * * *